(12) United States Patent
Ito et al.

(10) Patent No.: US 7,009,410 B2
(45) Date of Patent: Mar. 7, 2006

(54) CAPACITANCE DETECTION TYPE SENSOR AND MANUFACTURING METHOD THEREOF

(75) Inventors: Masaki Ito, Kasugai (JP); Hideo Onodera, Kawasaki (JP); Shigeru Iwamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 55 days.

(21) Appl. No.: 10/279,008

(22) Filed: Oct. 24, 2002

(65) Prior Publication Data

US 2003/0179001 A1    Sep. 25, 2003

(30) Foreign Application Priority Data

Mar. 20, 2002    (JP) .............................. 2002-077937

(51) Int. Cl.
*G01R 27/26*    (2006.01)

(52) U.S. Cl. ...................... 324/690; 324/658; 324/663; 324/686

(58) Field of Classification Search ................ 324/763, 324/765, 661, 519, 662, 687, 688, 658
See application file for complete search history.

(56) References Cited

U.S. PATENT DOCUMENTS

| | | | | |
|---|---|---|---|---|
| 5,328,553 A | * | 7/1994 | Poon ........................... | 438/633 |
| 6,114,862 A | * | 9/2000 | Tartagni et al. ............. | 324/662 |
| 6,478,976 B1 | * | 11/2002 | Lepert et al. ................. | 216/18 |
| 6,483,931 B1 | * | 11/2002 | Kalnitsky et al. ........... | 382/124 |
| 6,515,488 B1 | * | 2/2003 | Thomas ...................... | 324/662 |

* cited by examiner

*Primary Examiner*—Vincent Q. Nguyen
*Assistant Examiner*—John Teresinski
(74) *Attorney, Agent, or Firm*—Arent Fox PLLC

(57) ABSTRACT

Capacitance sensor electrodes are arranged in a form of matrix on a semiconductor substrate and coated with a cover film. These capacitance sensor electrodes are connected to a drive circuit. ESD electrodes are arranged in the vicinities of corner portions of the capacitance sensor electrodes. Each ESD electrode is composed of a film containing, for example, aluminum excellent in conductivity and a TiN film formed thereon. The ESD electrodes are grounded through the semiconductor substrate. On each ESD electrode, a plurality of fine ESD holes reaching the ESD electrode from a surface of the cover film are formed.

21 Claims, 13 Drawing Sheets

CAPACITANCE DETECTION TYPE SENSOR AND MANUFACTURING METHOD THEREOF

CROSS-REFERENCE TO RELATED APPLICATIONS

This application is based upon and claims priority of Japanese Patent Application No.2002-077937, filed in Mar. 20, 2002, the contents being incorporated herein by reference.

BACKGROUND OF THE INVENTION

1. Field of the Invention

The present invention relates to a capacitance detection type sensor provided with an electrostatic discharge (hereinafter referred to as ESD) hole for preventing a breakdown thereof due to static electricity, and more particularly, to a capacitance detection type sensor suitable for detecting a fingerprint.

2. Description of the Prior Art

Recently, a highly information-oriented society has come, and thus the necessity of securing not only assets but also information has been increased. With such an increase of the necessity, systems for identifying individuals have come to be required. Among the systems as described above, there is a fingerprint detection apparatus for recognizing a fingerprint pattern to identify an individual.

In the fingerprint detection apparatus, an optical detection type fingerprint sensor is generally used. However, the optical detection type fingerprint sensor has a drawback that cost reduction thereof is difficult since a system becomes relatively large in scale. Accordingly, demand is increased for a capacitance detection type fingerprint sensor, in which a system is relatively simple, and cost reduction is enabled.

FIG. 1 is a plan view showing a configuration of a conventional capacitance detection type fingerprint sensor, and FIG. 2 is a schematic cross-sectional view showing the same.

On a semiconductor substrate 50, a large number of fine capacitance sensor electrodes 53 are formed in matrix arrangement. The capacitance sensor electrodes 53 are connected to a drive circuit 51 formed on the semiconductor substrate 50. Moreover, on the capacitance sensor electrodes 53, a cover film 55 made of an insulating material is formed.

ESD holes 54 are selectively formed in the cover film 55. The ESD holes 54 are formed in the vicinities of corner portions of the capacitance sensor electrodes 53, and on bottom portions of the ESD holes 54, ESD electrodes 56 are arranged. The ESD electrodes 56 are electrically connected to the semiconductor substrate 50 and grounded through the semiconductor substrate 50.

In the capacitance detection type fingerprint sensor thus configured, when a fingerprint is detected, first, a specified charge is filled in the capacitance sensor electrodes 53 from the drive circuit 51. Subsequently, as shown in FIG. 3, when a finger of a subject is brought into contact with the surface of the cover film 55, a potential of the capacitance sensor electrodes 53 are changed by a capacitance between the finger and the capacitance sensor electrodes 53. In this case, intervals between the finger and the capacitance sensor electrodes 53 differ depending on places because of unevenness (fingerprint) of the finger, and variation occurs in the potentials of the capacitance sensor electrodes 53. After the passage of a specified time, the drive circuit 51 detects the potentials of the capacitance sensor electrodes 53, and based on a result of the detection, an image showing a distribution of the potentials is created. As mentioned above, the potentials of the capacitance sensor electrodes 53 are related to the unevenness (fingerprint) of the finger, and therefore, the image showing the distribution of the potentials of the capacitance sensor electrodes 53 represents a fingerprint pattern.

Incidentally, in the capacitance detection type fingerprint sensor, it is necessary to bring the finger of the subject in direct contact with the surface of the cover film 55. In this case, there is an apprehension that static electricity (of several thousand voltage) charged in a human body may be discharged to the capacitance sensor electrodes 53 to break the cover film 55.

In order to prevent the breakdown of the fingerprint sensor due to the discharge, which is as described above, the ESD holes 54 are provided. Heretofore, a diameter of the ESD holes 54 has been 5 $\mu$m or more, and as shown in FIG. 1, the ESD holes 54 are arranged in the vicinities of the corner portions of the capacitance sensor electrodes 53. The static electricity charged in the human body is discharged to the ESD electrodes 56 in the ESD holes 54 preferentially rather than to the capacitance sensor electrodes 53. Therefore, destruction of the cover film 55 due to the discharge is avoided.

The inventors of the present invention conceive that the conventional capacitance detection type fingerprint sensor described above has a problem shown below. Specifically, moisture and salt are adhered onto the surface of the human finger. When the fingerprint is detected, it is necessary to bring the surface of the finger in contact with the surface of the fingerprint sensor. In this case, the moisture and the salt, which have been adhered onto the finger, enter the ESD holes 54. Usually, each ESD electrode 56 has a stacked structure of an aluminum film excellent in conductivity and a TiN film excellent in corrosion resistance. However, if cracks occur in the TiN film, the moisture and the salt enter the aluminum film therefrom, and the aluminum film becomes corroded.

FIG. 4 is a view showing a microscope photograph of the ESD hole. As shown in FIG. 4, in the conventional capacitance detection type fingerprint sensor, the cracks (portions surrounded by circles in the figure) frequently occur in the TiN film coating the aluminum film. When an accelerated test is carried out for the capacitance detection type fingerprint sensor as described above by salt spray (for 12 hours), the aluminum film is intensely corroded by the moisture and the salt, which have entered the aluminum film from the cracks of the TiN film. Consequently, wires and elements of the sensor are damaged, and a function as the sensor becomes lost.

Causes of occurrence of the cracks in the TiN film are not obvious. However, since a difference in thermal expansion coefficient between aluminum and TiN is relatively large, the cracks are conceived to occur due to occurrence of a large stress on an interface between the aluminum film and the TiN film, which is caused by heat during film forming and chip cutting. Moreover, the cracks are conceived to occur due to occurrence of a stress in the TiN film since grains in the aluminum film are moved by heat.

It is also considered that the ESD electrodes are formed of metal higher in corrosion resistance than aluminum. However, since the ESD electrodes are formed simultaneously with wiring of the drive circuit, if the ESD electrodes are formed of metal different from a wiring material, then there occurs a new problem that the number of manufacturing steps is increased to increase a cost of the product.

SUMMARY OF THE INVENTION

From the above, it is an object of the present invention to provide a capacitance detection type senor, in which the breakdown of the cover film due to the discharge can be prevented, the ESD electrodes are difficult to be corroded, and a high reliability can be secured for a long period of time, and to provide a manufacturing method thereof.

A capacitance detection type sensor of the present invention is a capacitance detection type sensor provided with a plurality of capacitance sensor electrodes, comprising: a substrate; an insulating film formed on the substrate; a first electrostatic discharge electrode film conductive and formed on the insulating film; a second electrostatic discharge electrode film conductive and formed so as to be electrically connected to the first electrostatic discharge electrode film; and a cover film covering surfaces of the plurality of capacitance sensor electrodes and having a plurality of openings provided therein, the openings reaching the second electrostatic discharge electrode film.

While one opening is provided for one electrostatic discharge electrode in the conventional capacitance detection type fingerprint sensor, the plurality of openings are provided for one electrostatic discharge electrode in the present invention. Thus, a stress occurring between the first electrostatic discharge electrode film and the second electrostatic discharge electrode film due to a temperature change and the like is dispersed by the plurality of openings, and cracks are prevented from occurring in the second electrostatic discharge electrode film.

Another capacitance detection type sensor of the present invention is a capacitance detection type sensor provided with a plurality of capacitance sensor electrodes, comprising: a substrate; a first insulating film formed on the substrate; a first electrostatic discharge electrode film conductive and formed on the first insulating film; a second insulating film formed on the first insulating film and the first electrostatic discharge electrode film; a second electrostatic discharge electrode film formed so as to be electrically connected to the first electrostatic discharge electrode film through a contact hole formed in the second insulating film; and a cover film covering surfaces of the plurality of capacitance sensor electrodes and having an opening provided therein, the opening reaching the second electrostatic discharge electrode film.

In the present invention, the second insulating film is formed on the first electrostatic discharge electrode film, and on the second insulating film, the second electrostatic discharge electrode film is formed. Then, the second electrostatic discharge electrode film is electrically connected to the first electrostatic discharge electrode film through the contact hole formed in the second insulating film. Thus, an amount of shift caused by the temperature change between the first electrostatic discharge electrode film and the second electrostatic discharge electrode film is reduced, and the cracks are prevented from occurring in the second electrostatic discharge electrode film.

Still another capacitance detection type sensor of the present invention is a capacitance detection type sensor provided with a plurality of capacitance sensor electrodes, comprising: a substrate; a first insulating film formed on the substrate; a first electrostatic discharge electrode film conductive and formed on the first insulating film; a second insulating film formed on the first insulating film and the first electrostatic discharge electrode film; a conductor plug formed in an opening of the second insulating film and electrically connected to the first electrostatic discharge electrode film; a second electrostatic discharge electrode film formed so as to be electrically connected to the conductor plug; and a cover film covering surfaces of the plurality of capacitance sensor electrodes and having an opening provided therein, the opening reaching the second electrostatic discharge electrode film.

In the present invention, the conductor plug is formed on the first electrostatic discharge electrode film, and on the conductor plug, the second electrostatic discharge electrode film is formed. Accordingly, the conductor plug is formed of a material difficult to be corroded, such as tungsten, and thus the corrosion of the first electrostatic discharge electrode film is avoided even if cracks occur in the second electrostatic discharge electrode film.

DESCRIPTION OF THE PREFERRED EMBODIMENT

Hereinafter, description will be made for embodiments of the present invention with reference to the accompanying drawings.

(First Embodiment)

Figure 1:
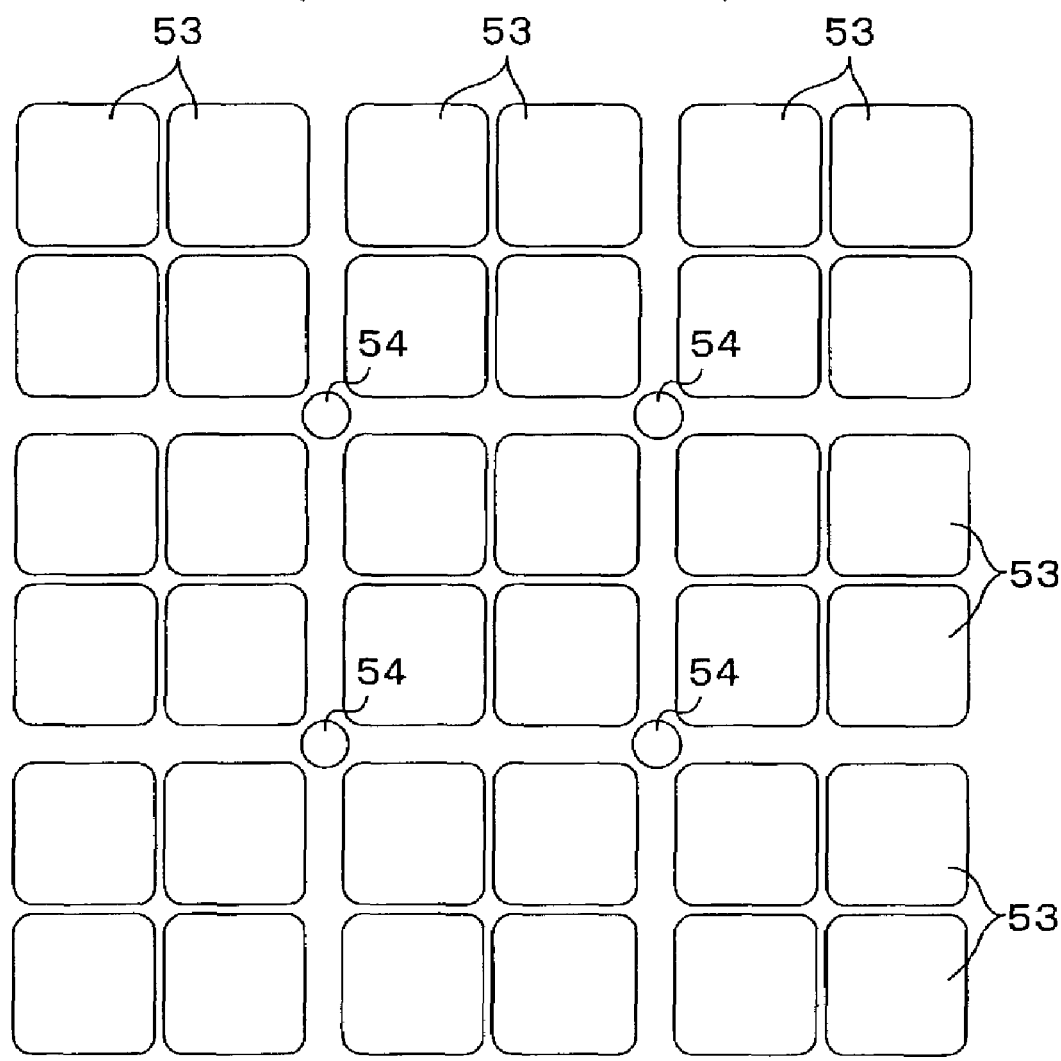
FIG. 1 is a plan view showing a configuration of a conventional capacitance detection type fingerprint sensor.
Figure 2:
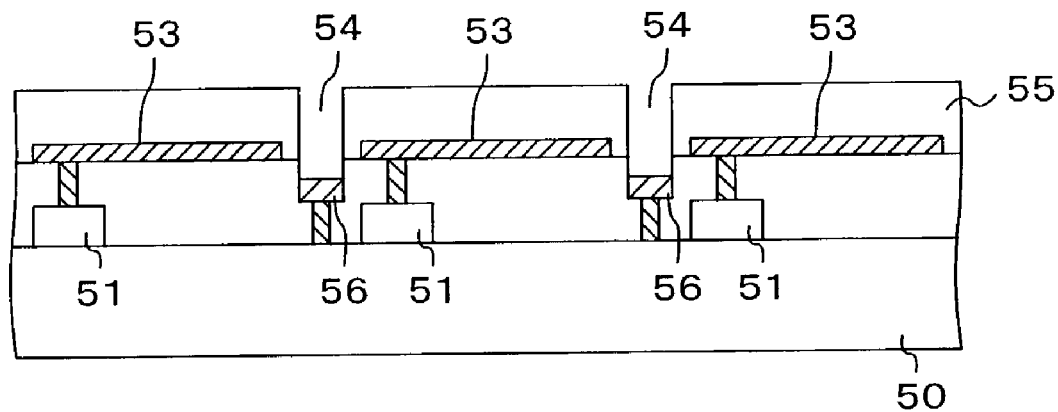
FIG. 2 is a schematic cross-sectional view of the conventional capacitance detection type fingerprint sensor.
Figure 3:
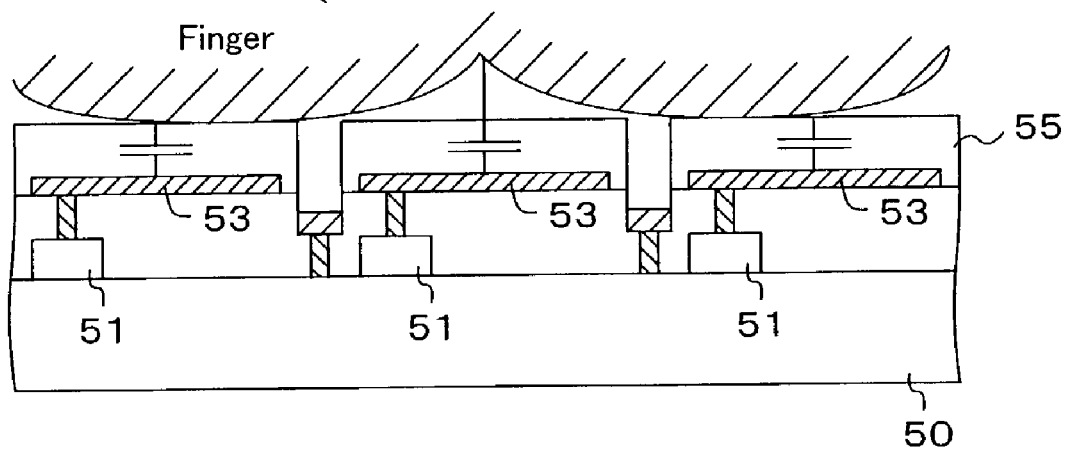
FIG. 3 is a schematic view showing a state of the capacitance detection type fingerprint sensor during detection of a fingerprint.
Figure 4:
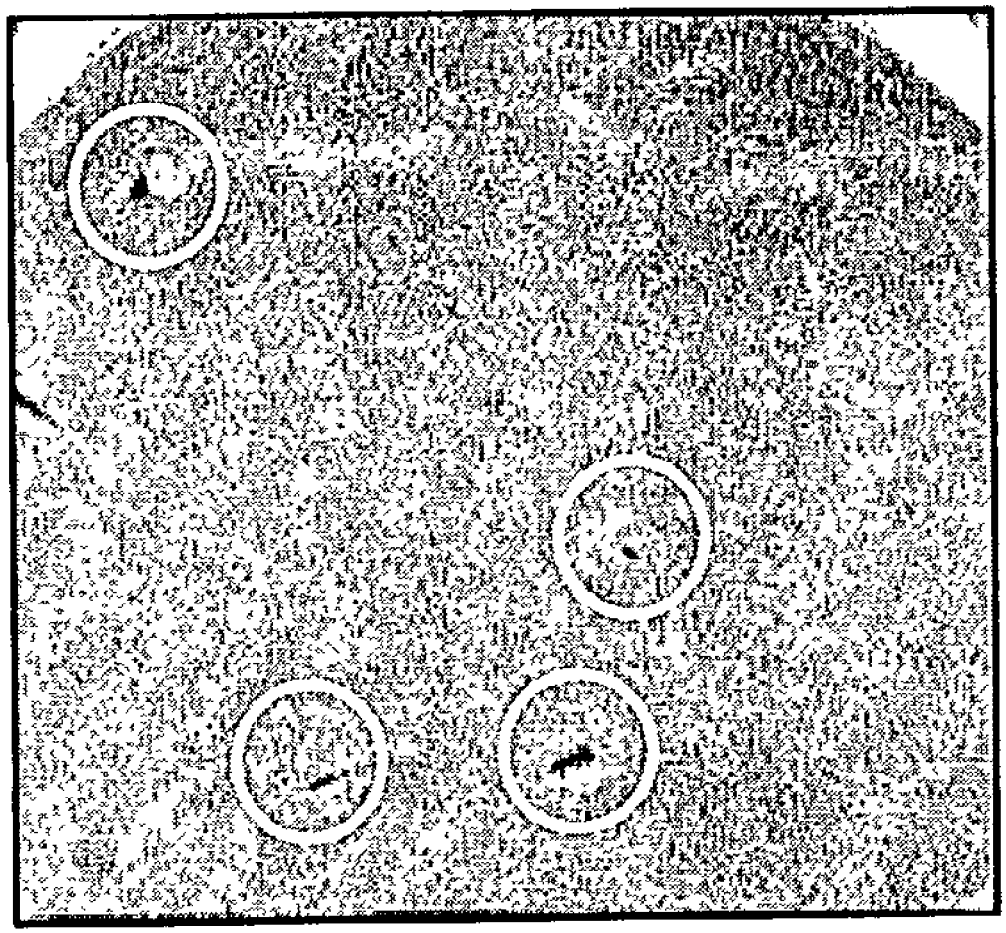
FIG. 4 is a view showing a microscope photograph of an ESD hole, showing a state where cracks occur in a TiN film.
Figure 5:
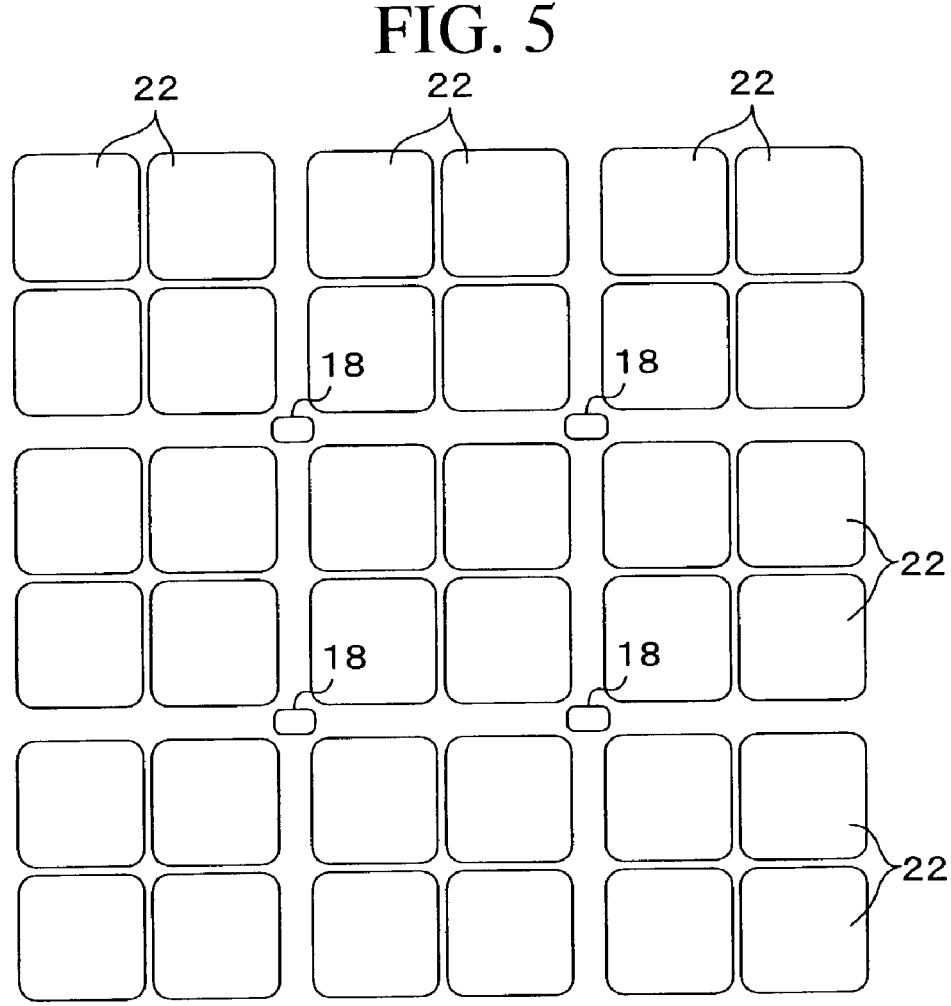
FIG. 5 is a plan view showing a configuration of a capacitance detection type sensor (fingerprint sensor) of a first embodiment of the present invention.
Figure 6:
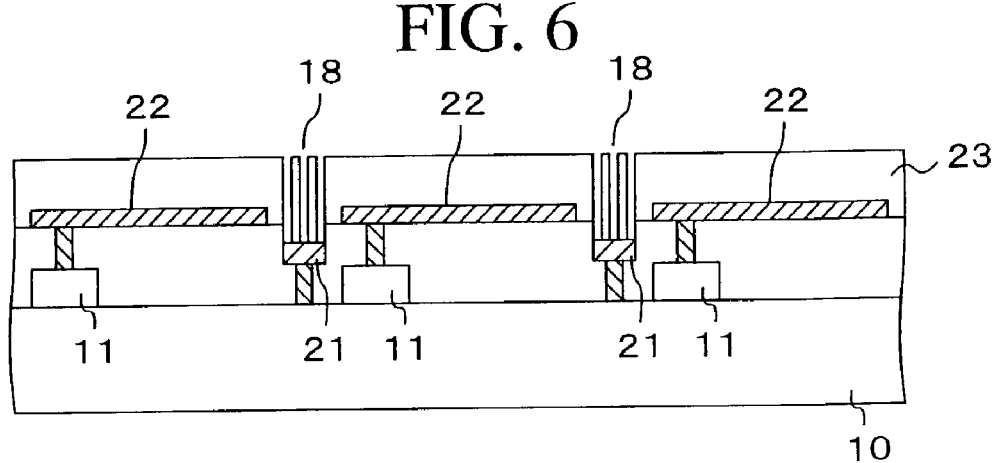
FIG. 6 is a schematic cross-sectional view of the capacitance detection type sensor of the first embodiment.

FIG. 5 is a plan view showing a configuration of a capacitance detection type sensor (fingerprint sensor) of a first embodiment of the present invention, and FIG. 6 is a schematic cross-sectional view showing the same.

On a silicon semiconductor substrate 10, a large number of fine capacitance sensor electrodes 22, which are approximately square with each side of approximately 100 μm, are formed in matrix arrangement. These capacitance sensor electrodes 22 are connected to a drive circuit 11 formed on the semiconductor substrate 10. On the capacitance sensor electrodes 22, a cover film 23 made of an insulating material such as $SiO_2$ and SiN is formed to have a thickness of approximately 800 nm.

ESD hole portions 18 are provided in the cover film 23, and a plurality of ESD holes are formed in each ESD hole portion 18. It is preferable that a diameter of one ESD hole be equal to/smaller than 5 μm. In this embodiment, the ESD holes have an approximately rectangular shape with each side of 0.85 μm. On bottom portions of the ESD holes, ESD electrodes 21 electrically connected to the semiconductor substrate 10 are arranged. In the capacitance detection type sensor of this embodiment, as shown in FIG. 5, one electrode block is composed of four pieces of mutually adjacent capacitance sensor electrodes 22, and the ESD hole portions 18 are arranged in the vicinities of corner portions of the respective electrode blocks. Moreover, the ESD electrodes 21 are grounded through the semiconductor substrate 10.

Figure 7:
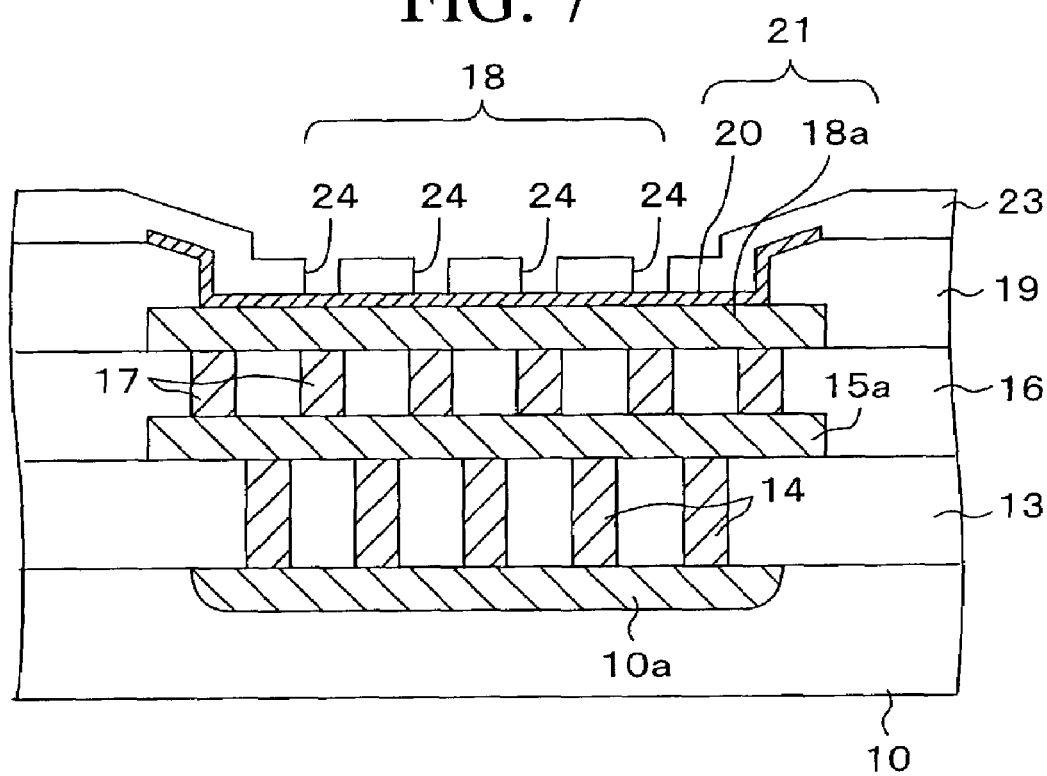
FIG. 7 is a cross-sectional view of an ESD hole portion of the capacitance detection type sensor of the first embodiment.
Figure 8:
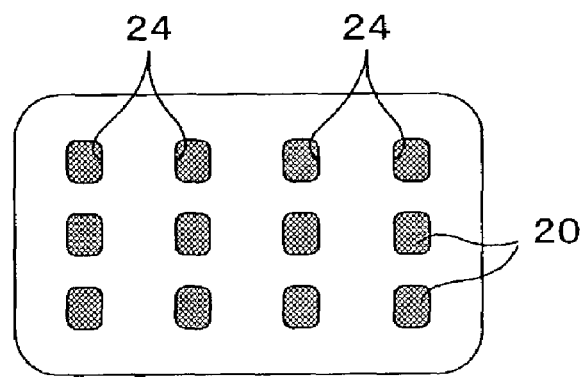
FIG. 8 is a plan view of the ESD hole portion of the capacitance detection type sensor of the first embodiment.
Figure 9:
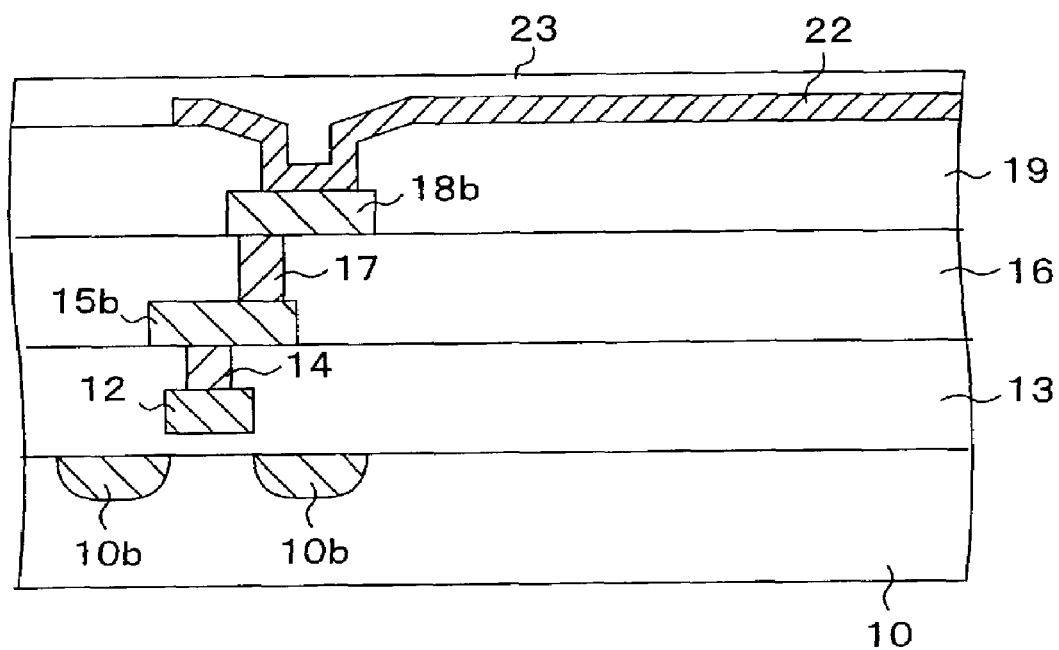
FIG. 9 is a cross-sectional view of a formed portion of a capacitance sensor electrode of the capacitance detection type sensor of the first embodiment.

FIG. 7 is a cross-sectional view of the ESD hole portion 18, FIG. 8 is a plan view of the same ESD hole portion 18, and FIG. 9 is a cross-sectional view of a formed portion of the capacitance sensor electrode 22. With reference to these figures, description will be made in more detail for the configuration of the capacitance detection type sensor of this embodiment. Note that, though the drive circuit 11 is actually formed of a plurality of transistors, only a transistor electrically connected to the capacitance sensor electrode 22 is illustrated in FIG. 9.

On the semiconductor substrate 10, a highly concentrated impurity region 10a connected to the ESD electrode 21 and source/drain regions 10b of a transistor constituting the drive circuit 11 are formed. Above a region between the pair of source/drain regions 10b, a gate electrode 12 is formed with a gate insulating film (not shown) interposed therebetween.

On the semiconductor substrate 10 and the gate electrode 12, a first interlayer insulating film 13 made of, for example, $SiO_2$ is formed. On the first interlayer insulating film 13, first layer wires (pads) 15a and 15b are formed of a material containing aluminum as a main component. The wire 15a is electrically connected to the highly concentrated impurity region 10a through tungsten (W) plugs 14 buried in the first interlayer insulating film 13. The wire 15b is electrically connected to the gate electrode 12 through another tungsten plug 14.

On the first interlayer insulating film 13 and the first layer wires 15a and 15b, a second interlayer insulating film 16 made of, for example, $SiO_2$ is formed. On the second interlayer insulating film 16, a first electrostatic discharge electrode film 18a and a second layer wire (pad) 18b are formed. These first electrostatic discharge electrode film 18a and second layer wire 18b are formed of the material containing aluminum as a main component. The first electrostatic discharge electrode film 18a is electrically connected to the first layer wire 15a through tungsten plugs 17 buried in the second interlayer insulating film 16. Moreover, the second layer wire 18b is electrically connected to the first layer wire 15b through another tungsten plug 17.

Note that, in the same wiring layer as that of the first layer wires 15a and 15b and in the same wiring layer as that of the second layer wire 18b, wires for constituting the drive circuit 11 are formed.

On the second interlayer insulating film 16, a third interlayer insulating film 19 made of, for example, $SiO_2$ is formed. However, in the ESD hole portion 18, the third interlayer insulating film 19 above the first electrostatic discharge electrode film 18a is opened, and on the first electrostatic discharge electrode film 18a, a second electrostatic discharge electrode film 20 made of a TiN film with a thickness of approximately 200 nm is formed. An edge portion of the second electrostatic discharge electrode film 20 is extended from the surface of the first electrostatic discharge electrode film 18a to the surface of the third interlayer insulating film 19. The ESD electrode 21 is composed of these first electrostatic discharge electrode film 18a and second electrostatic discharge electrode film 20.

Moreover, also on the second layer wire 18b, an opening of the third interlayer insulating film 19 is provided. On the third interlayer insulating film 19, the capacitance sensor electrode 22 electrically connected to the second layer wire 18b through the opening is formed. The capacitance sensor electrode 22 is also formed of the material containing aluminum as a main component.

The cover film 23 made of an insulator such as SiN and $SiO_2$ is formed on the third interlayer insulating film 19, the second electrostatic discharge electrode film 20 and the capacitance sensor electrode film 22. However, in the ESD hole portion 18, a plurality of ESD holes 24 reaching the second electrostatic discharge electrode film 20 are formed in the cover film 23. In this embodiment, as shown in FIG. 8, the ESD holes 24 are arranged in an array of 3 rows and 4 columns. Note that, in order to prevent the occurrence of cracks in the second electrostatic discharge electrode film 20 made of TiN, it is preferable that a size of the ESD hole 24 be set equal to/smaller than 5 μm×5 μm. In this embodiment, the size of the ESD hole 24 is set at 0.85 μm×0.85 μm.

In the capacitance detection type sensor of this embodiment, which is thus configured, when a fingerprint is detected, first, a specified charge is filled in the capacitance sensor electrode 22 from the drive circuit 11. Subsequently, when a finger of a subject is brought in contact with the surface of the cover film 23, a potential of the capacitance sensor electrode 22 is changed by a capacitance between the finger and the capacitance sensor electrode 22. In this case, because of unevenness (fingerprint) of the finger, intervals between the finger and the capacitance sensor electrode 22 differ depending on places, and variation occurs in the potentials of the respective capacitance sensor electrodes 22. After the passage of a specified time, the drive circuit 11 detects the potentials of the capacitance sensor electrodes 22, and based on a result of the detection, an image showing a distribution of the potentials is created. As mentioned above, the potentials of the capacitance sensor electrodes 22 are related to the unevenness (fingerprint) of the finger, and therefore, the image showing the distribution of the potentials of the capacitance sensor electrodes 22 represents a fingerprint pattern.

The static electricity in the human body is discharged to the ESD electrodes 21 in the ESD holes 24 preferentially rather than to the capacitance sensor electrodes 22. Therefore, destruction of the cover film 23 due to the discharge is avoided.

In this embodiment, the large number of ESD holes 24 are formed on the ESD electrodes 21, and an area of each ESD hole 24 is small. Therefore, even if a stress occurs, due to a temperature change and the like, between the first electrostatic discharge electrode film (aluminum film) 18a and the second electrostatic discharge electrode film (TiN film) 20, the stress is dispersed in a wide range, and the cracks are prevented from occurring in the second electrostatic discharge electrode film 20. Thus, even if the moisture and the salt enter the ESD holes 24 as a result of a long-term use, corrosion of the first electrostatic discharge electrode film 18a is avoided. Accordingly, the capacitance detection type sensor of this embodiment can maintain a high reliability for a long period of time.

Moreover, in this embodiment, the ESD electrodes 21 are formed in a wiring layer lower than the layer of the capacitance sensor electrodes 22. In the case where the ESD electrodes 21 and the capacitance sensor electrodes 22 are formed in the same wiring layer, it is conceived that stresses are concentrated on edge portions of the ESD electrodes 21 and the capacitance sensor electrodes 22 when the surface of the cover film 23 is pushed by a finger, thus causing the cracks on the cover film 23, the interlayer insulating film 19 and the like. However, as in this embodiment, the ESD electrodes 21 and the capacitance sensor electrodes 22 are formed in wiring layers different from each other. Thus, the concentration of the stresses to the edge portions of the ESD electrodes 21 and the capacitance sensor electrodes 22 is restricted, and the occurrence of the cracks in the cover film 23, the interlayer insulating film 19 and the like is avoided.

Furthermore, the plurality of ESD holes 24 are arranged evenly in the ESD hole portions 18 as in this embodiment. Thus, the stress applied to each ESD hole portion 18 is dispersed approximately evenly in the entire ESD hole portion 18. Therefore, a possibility that the cracks occur in the cover film 23 in the ESD hole portions 18 can be lowered.

Figure 10:
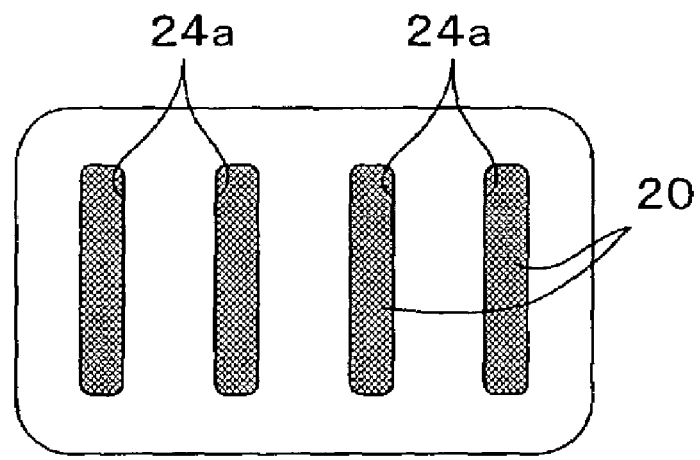
FIG. 10 is a plan view showing a modification example (No. 1) of an ESD hole of the capacitance detection type sensor of the first embodiment.
Figure 11:
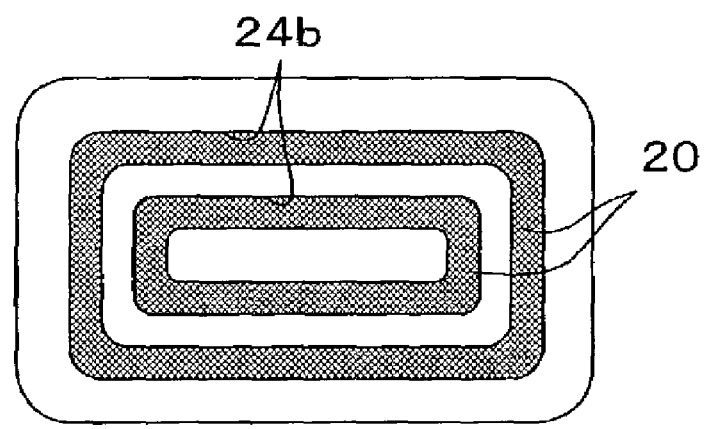
FIG. 11 is a plan view showing a modification example (No. 2) of the ESD hole of the capacitance detection type sensor of the first embodiment.

Note that, as shown in FIG. 10, the ESD holes may be formed in the form of stripes of which width is equal to/narrower than 5 μm (for example, 0.85 am). Moreover, as shown in FIG. 11, the ESD holes may be formed in the form of concentric circles of which width is equal to/narrower than 5 μm (for example, 0.85 μm). In FIG. 10, the ESD holes are denoted by a reference numeral 24a, and in FIG. 11, the ESD holes are denoted by a reference numeral 24b. Also in such cases, a similar effect to that in the above-described embodiment can be obtained.

Hereinafter, description will be made for a manufacturing method of the capacitance detection type sensor of this embodiment with reference to FIG. 7 and FIG. 9.

First, by the local oxidation of silicon (LOCOS) method or the shallow trench isolation (STI) method, an insulating film or an insulating trench (not shown) is formed, and by the insulating film or the insulating trench, the semiconductor substrate 10 is divided into a plurality of element regions.

Thereafter, the gate electrodes 12 with a thickness of, for example, 300 nm are selectively formed on the semiconductor substrate 10 with the gate insulating film interposed therebetween. Then, impurities are introduced to the semiconductor substrate 10 using the gate electrodes 12 as masks, and the source/drain regions 10b are formed. Moreover, the impurities are introduced also to the surface of the semiconductor substrate 10 on regions where the ESD electrodes are formed, and the highly concentrated impurity region 10a is formed. Note that the gate electrodes 12 may be formed of metal such as aluminum, or may be formed of polysilicon to which impurities such as boron (B) are introduced at a high concentration.

Next, by the chemical vapor deposition (CVD) method, the first interlayer insulating film 13 with a thickness of approximately 700 nm is formed over the entire upper surface of the substrate 10. This first interlayer insulating film 13 is formed of any one of a $SiO_2$ film, a SiON film and a SiN film or formed by stacking two or more of these films. Thereafter, contact holes reaching the highly concentrated impurity region 10a and the gate electrodes 12 are formed in the first interlayer insulating film 13.

Next, by the sputtering method, above the entire upper surface of the substrate 10, a Ti film is formed to have a thickness of approximately 5 nm, and a TiN film is formed to have a thickness of approximately 15 nm. Furthermore, a tungsten (W) film is formed to have a thickness of approximately 800 nm, and the tungsten is buried in the contact holes. Thereafter, the tungsten film, the TiN film and the Ti film on the first interlayer insulating film 13 undergo the chemical mechanical polishing (CMP), and the tungsten film, the TiN film and the Ti film are removed, which are located in portions other than the contact holes. Thus, the tungsten plugs 14 are formed.

Subsequently, a TiN film, an AlCu alloy film and a TiN film are sequentially formed to have thicknesses of 15 nm, 500 nm and 15 nm, respectively. Then, these films are patterned by the photolithography method to form the first layer wires 15a and 15b.

Next, the second interlayer insulating film 16 made of $SiO_2$ is formed to have a thickness of approximately 1 μm above the entire upper surface of the substrate 10. Then, contact holes reaching the first layer wires 15a and 15b are formed in the second interlayer insulating film 16.

Subsequently, by the sputtering method, a Ti film and a TiN film are formed to have thicknesses of 5 nm and 15 nm, respectively above the entire upper surface of the substrate 10. Furthermore, a tungsten film is formed, and the tungsten is buried in the contact holes. Thereafter, the tungsten film, the TiN film and the Ti film on the second interlayer insulating film 16 undergo the CMP, and the tungsten film, the TiN film and the Ti film are removed, which are located in portions other than the contact holes. Thus, the tungsten plugs 17 are formed.

Subsequently, a TiN film, an AlCu alloy film and a TiN film are sequentially formed to have thicknesses of 15 nm, 500 nm and 15 nm, respectively above the entire upper surface of the substrate 10. Then, these films are patterned by the photolithography method to form the first electrostatic discharge electrode film 18a and the second layer wire 18b.

Next, the third interlayer insulating film 19 made of, for example, $SiO_2$ is formed to have a thickness of approximately 1.3 µm above the entire upper surface of the substrate 10. Then, openings reaching the first electrostatic discharge electrode film 18a and the second layer wire 18b are formed in the third interlayer insulating film 19 by the photolithography method.

Next, a TiN film is formed to have a thickness of approximately 200 µm on the substrate 10. Then, the TiN film is patterned to form the second electrostatic discharge electrode film 20. Moreover, a TiN film, an AlCu alloy film and a TiN film are sequentially formed to have thicknesses of 15 nm, 500 nm and 15 nm, respectively above the entire upper surface of the substrate 10. Then, these films are patterned by the photolithography method to form the capacitance sensor electrodes 22.

Subsequently, a $SiO_2$ film and a SiN film are sequentially formed to have thicknesses of 100 nm and approximately 700 nm, respectively above the entire upper surface of the substrate 10, thus forming the cover film 23. Then, by the photolithography method, the plurality of ESD holes 24 having an approximately rectangular shape with each side of approximately 0.85 µm are formed in the cover film 23 of the ESD hole portion 18.

In such a manner as described above, the capacitance detection type sensor of this embodiment can be manufactured.

According to this embodiment, since the ESD electrodes 21 are formed simultaneously when the wires constituting the drive circuit 11 are formed, the capacitance detection type sensor can be manufactured with a small number of manufacturing steps.

(Second Embodiment)

Figure 12:
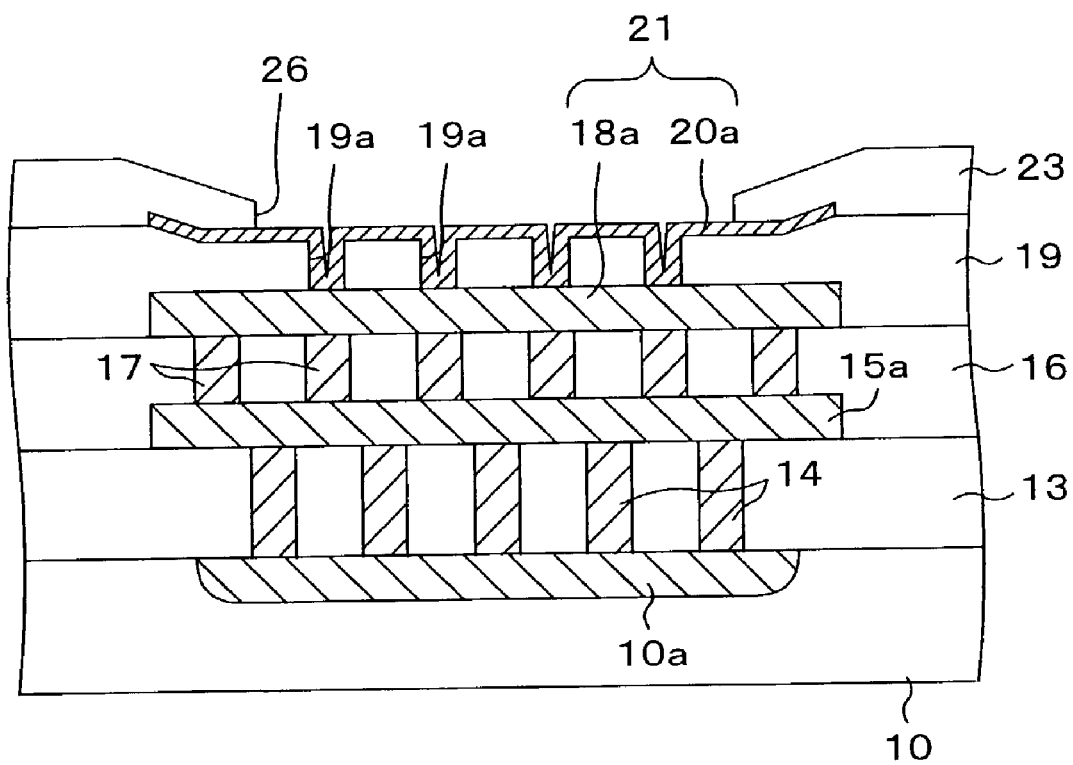
FIG. 12 is a cross-sectional view of an ESD hole portion of a capacitance detection type sensor (fingerprint sensor) of a second embodiment of the present invention.
Figure 13:
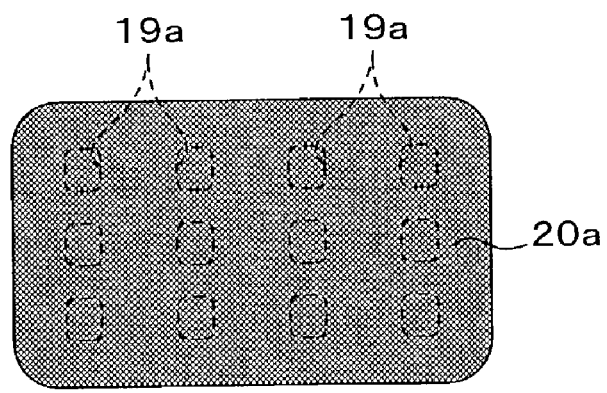
FIG. 13 is a plan view of the ESD hole portion of the capacitance detection type sensor of the second embodiment.

Hereinafter, description will be made for a capacitance detection type sensor (fingerprint sensor) of a second embodiment of the present invention with reference to a cross-sectional view of an ESD hole portion, which is shown in FIG. 12, and a plan view of the ESD hole portion, which is shown in FIG. 13.

The capacitance detection type sensor of this embodiment is different from that of the first embodiment in a structure of the ESD hole portion, and structures of others are basically similar to those of the first embodiment. Therefore, the same reference numerals are added to matters in FIG. 12, which are the same as those in FIG. 7, and description for the repeated portions will be omitted. Moreover, since the configuration of the capacitance sensor electrode portion is basically similar to that of the first embodiment, description for the capacitance sensor electrode portion will be omitted here.

In this embodiment, a second electrostatic discharge electrode film (TiN film) 20a is formed on the third insulating film 19, and an ESD hole 26 with a size of, for example, 8 µm×8 µm is opened in the cover film 23 such that the second electrostatic discharge electrode film 20a is exposed therefrom. Moreover, the second electrostatic discharge electrode film 20a is electrically connected to the first electrostatic discharge electrode film 18a through contact holes 19a formed in the third interlayer insulating film 19. The contact holes 19a have a size of, for example, 0.85 µm×0.85 µm, and as shown in FIG. 13, the contact holes 19a are arranged in an array of 3 rows and 4 columns in the ESD hole portion 26.

In this embodiment, the second electrostatic discharge electrode film 20a is formed on the third interlayer insulating film 19 and connected to the first electrostatic discharge electrode film 18a through the contact holes 19a. Therefore, a stress occurring, due to the temperature change, between the first electrostatic discharge electrode film 18a and the second electrostatic discharge electrode film 20a is small, and the occurrence of cracks in the second electrostatic discharge electrode film 20a is restricted. Moreover, even if cracks occur in the second electrostatic discharge electrode film 20a on a portion on the third interlayer insulating film 19, corrosion of the first electrostatic discharge electrode film 18a is prevented more securely. Thus, even if the moisture and the salt enter the ESD hole 26 as a result of a long-term use, the possibility that the first electrostatic discharge electrode film 18a is corroded is low, and a high reliability can be maintained for a long period of time.

Figure 14:
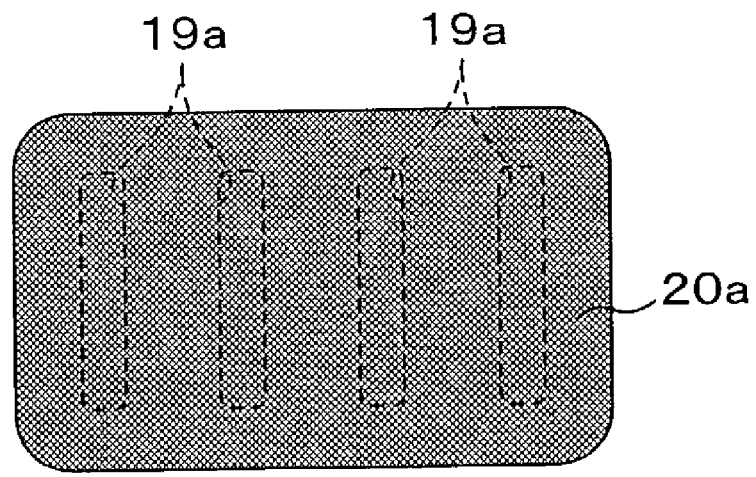
FIG. 14 is a plan view showing a modification example (No. 1) of a contact hole of the capacitance detection type sensor of the second embodiment.
Figure 15:
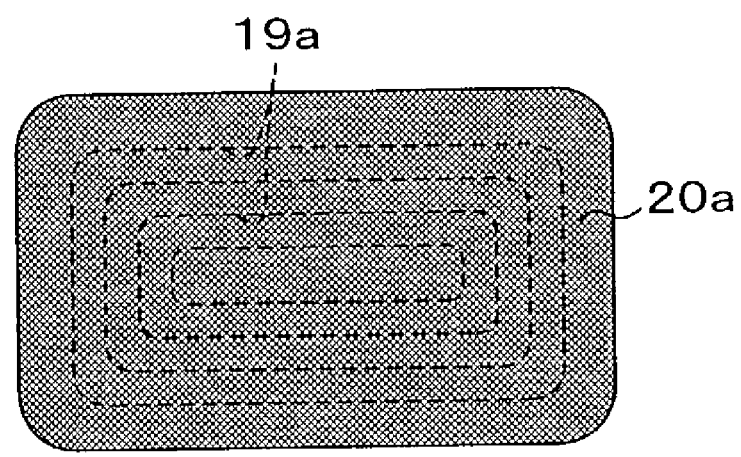
FIG. 15 is a plan view showing a modification example (No. 2) of the contact hole of the capacitance detection type sensor of the second embodiment.

Note that the contact holes 19a formed in the third interlayer insulating film 19 may be formed in the form of stripes as shown in FIG. 14, or may be formed in the form of concentric circles as shown in FIG. 15.

Hereinafter, description will be made for a manufacturing method of the capacitance detection type sensor of this embodiment with reference to FIG. 12.

By a similar method to that of the first embodiment, on the substrate 10, formed are a transistor, the first interlayer insulating film 13, the first layer wire 15a, the second interlayer insulating film 16, the tungsten plugs 14 and 17 and the like. Then, a Ti film, an aluminum film and a Ti film are sequentially formed on the second interlayer insulating film 16. Then, these stacked films are patterned to form the first electrostatic discharge electrode film 18a.

Next, above the entire upper surface of the substrate 10, the third interlayer insulating film 19 with a thickness of approximately 1.3 µm, which is made of $SiO_2$, is formed. Then, by the photolithography method, the contact holes 19a reaching the first electrostatic discharge electrode film 18a is formed in the third interlayer insulating film 19.

Next, by the physical vapor deposition (PVD) method or the metal organic chemical vapor deposition (MOCVD) method, a TiN film is formed to have a thickness of approximately 200 nm above the entire upper surface of the substrate 10. Then, the TiN film is patterned to form the second electrostatic discharge electrode film 20a. The ESD electrode 21 is composed of the first electrostatic discharge electrode film 18a and the second electrostatic discharge electrode film 20a.

In general, the PVD method has an advantage capable of forming a stable TiN film inexpensively. However, the formation of the TiN film in the contact holes by the PVD method has a drawback that a portion where the film thickness is thin is apt to occur. Meanwhile, in the case of forming the TiN film by the MOCVD method, the TiN film can be formed with a relatively even thickness also in the contact holes.

Subsequently, similarly to the first embodiment, the cover film 23 having a stacked structure of a $SiO_2$ film with a thickness of 100 nm and a SiN film with a thickness of 700 nm is formed above the entire upper surface of the substrate 10. Then, the opening (ESD hole) 26 reaching the ESD electrode 21 is formed in the cover film 23. Thus, the capacitance detection type sensor of this embodiment is completed.

(Third Embodiment)

Figure 16:
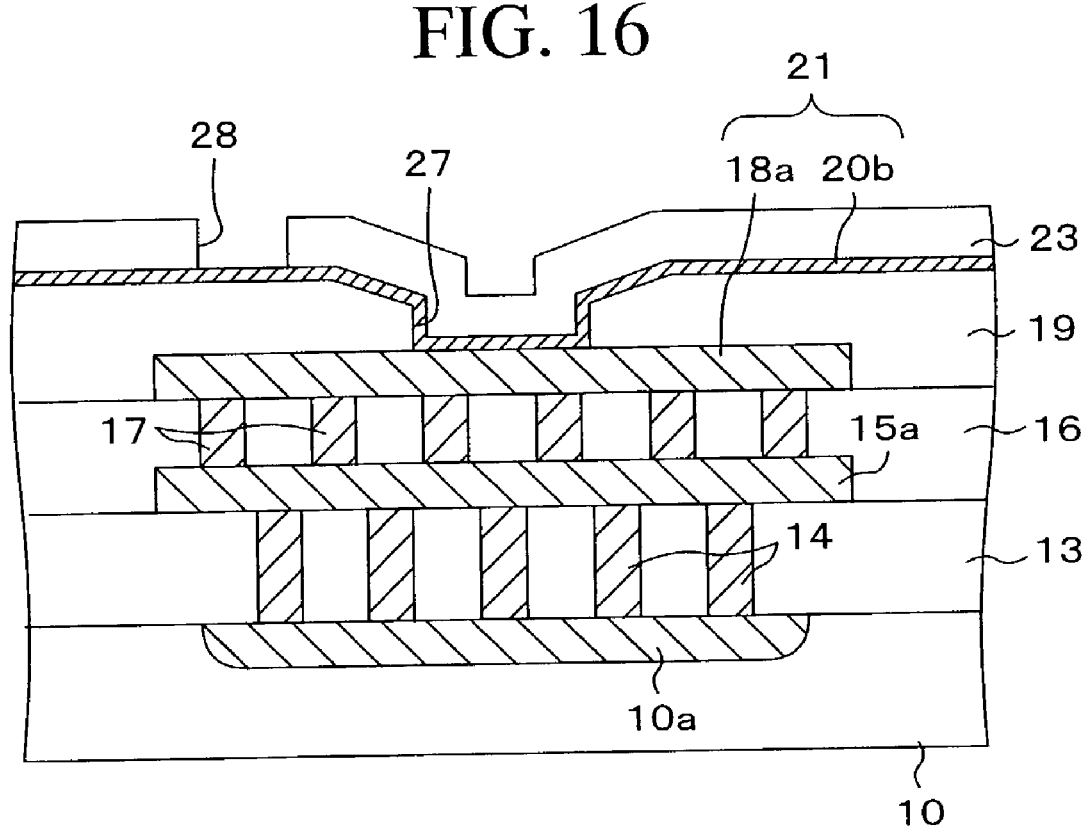
FIG. 16 is a cross-sectional view of an ESD hole portion of a capacitance detection type sensor (fingerprint sensor) of a third embodiment of the present invention.
Figure 17:
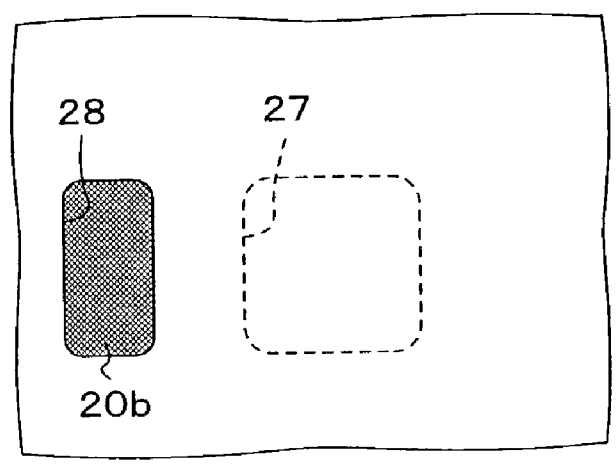
FIG. 17 is a plan view of the ESD hole portion of the capacitance detection type sensor of the third embodiment.

Hereinafter, description will be made for a capacitance detection type sensor (fingerprint sensor) of a third embodiment of the present invention with reference to a cross-sectional view of an ESD hole portion, which is shown in FIG. 16, and a plan view of the ESD hole portion, which is shown in FIG. 17.

The capacitance detection type sensor of this embodiment is different from that of the first embodiment in the structure of the ESD hole portion, and the structures of others are basically similar to those of the first embodiment. Therefore, the same reference numerals are added to matters in FIG. 16, which are the same as those in FIG. 7, and description for the repeated portions will be omitted. Moreover, since the configuration of the capacitance sensor electrode portion is basically similar to that of the first embodiment, description for the capacitance sensor electrode portion will be omitted here.

In this embodiment, a second electrostatic discharge electrode film 20b made of TiN is formed on the third interlayer insulating film 19, and this second electrostatic discharge electrode film 20b is electrically connected to the first electrostatic discharge electrode film 18a through a contact hole 27 provided in the third interlayer insulating film 19.

The cover film 23 is formed on the third interlayer insulating film 19 and the second electrostatic discharge electrode film 20b. Moreover, the ESD hole 28 is provided in a position apart from the contact hole 27. A size of the ESD hole 28 is, for example, approximately 5 μm×5 μm.

In this embodiment, the ESD hole 28 is formed in a position apart from a connected portion of the first electrostatic discharge electrode film 18a and the second electrostatic discharge electrode film 20b. Therefore, even if cracks occur in the second electrostatic discharge electrode film 20b in the ESD hole 28, there is no apprehension that the moisture and the salt enter the first electrostatic discharge electrode film 18a. Thus, also in the capacitance detection type sensor of this embodiment, obtained is the effect that the high reliability can be maintained for a long period of time.

Figure 18:
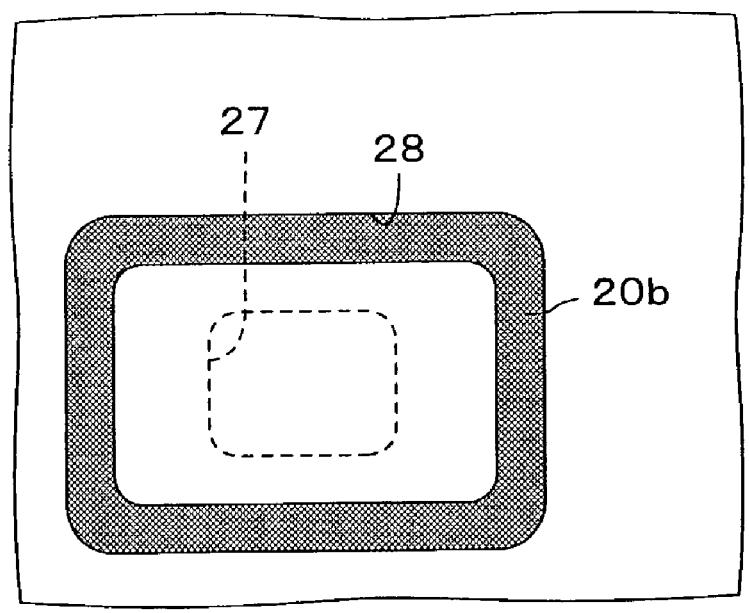
FIG. 18 is a plan view showing a modification example (No. 1) of an ESD hole of the capacitance detection type sensor of the third embodiment.
Figure 19:
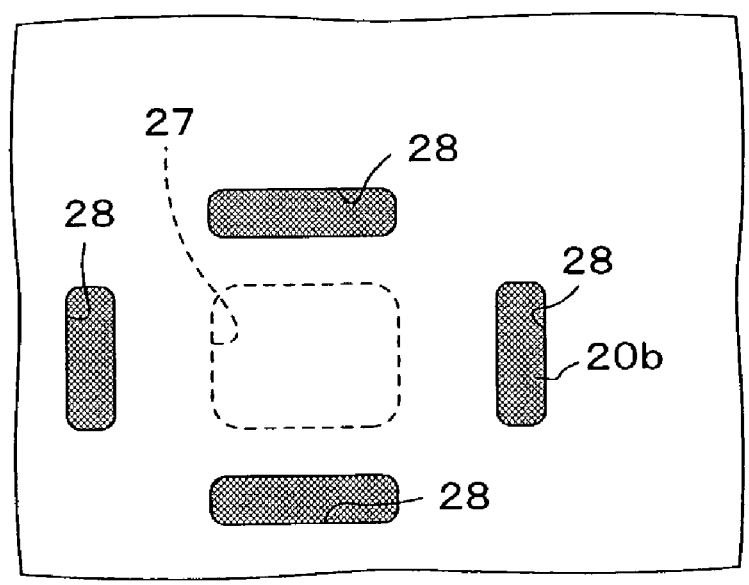
FIG. 19 is a plan view showing a modification example (No. 2) of the ESD hole of the capacitance detection type sensor of the third embodiment.

Note that the ESD hole 28 may be formed in the form of ring surrounding the contact hole 27 as shown in FIG. 18. Alternatively, as shown in FIG. 19, the plurality of ESD holes 28 may be formed dispersedly around the contact hole 27.

Hereinafter, description will be made for a manufacturing method of the capacitance detection type sensor of this embodiment with reference to FIG. 16.

Similarly to the first embodiment, the components up to the first electrostatic discharge electrode film 18a are formed on the substrate 10. Thereafter, the third interlayer insulating film 19 is formed above the entire upper surface of the substrate 10. Then, the contact hole 27 reaching the first electrostatic discharge electrode film 18a is formed in the third interlayer insulating film 19, followed by the formation of a TiN film with a thickness of approximately 200 nm above the entire upper surface of the substrate 10. Then, the TiN film is patterned to form the second electrostatic discharge electrode film 20b. In this case, similarly to the first embodiment, a capacitance sensor electrode (not shown) is formed on the third interlayer insulating film 19.

Subsequently, the cover film 23 made of a SiO$_2$ film with a thickness of 100 nm and a SiN film with a thickness of 700 nm is formed above the entire upper surface of the substrate 10. Thereafter, in the cover film 23, the ESD hole 28 is formed, from which the second electrostatic discharge electrode film 20b is exposed. In this case, the ESD hole 28 is formed in the position apart from the contact hole 27. Thus, the capacitance detection type sensor of this embodiment is completed.

(Fourth Embodiment)

Figure 20:
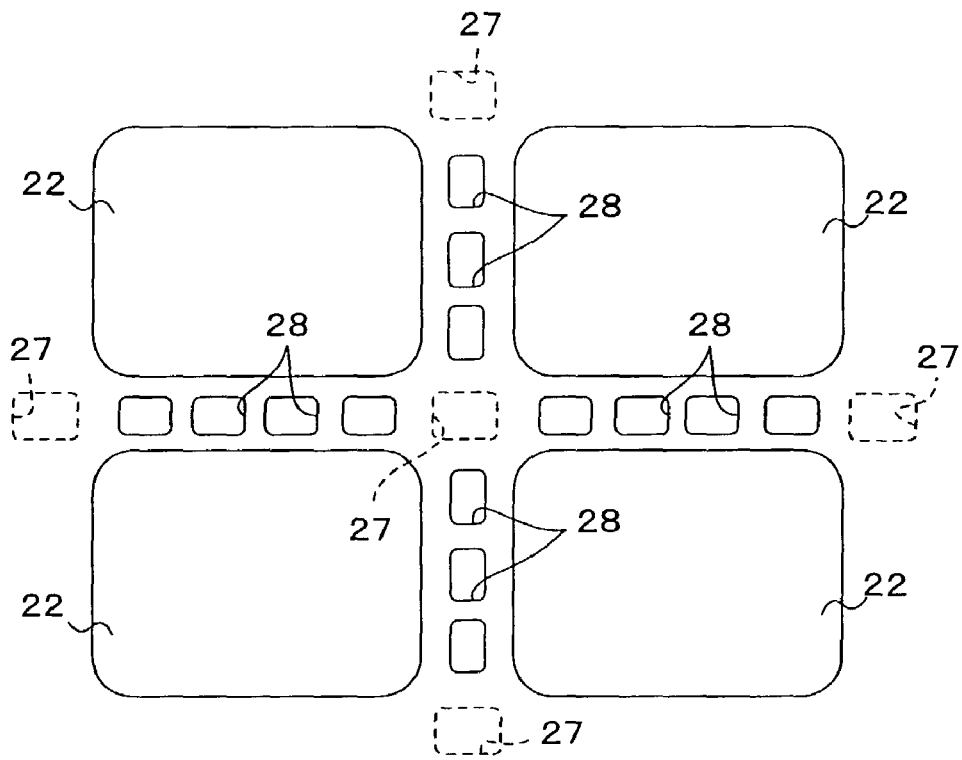
FIG. 20 is a plan view showing a configuration of a capacitance detection type sensor (fingerprint sensor) of a fourth embodiment of the present invention.
Figure 21:
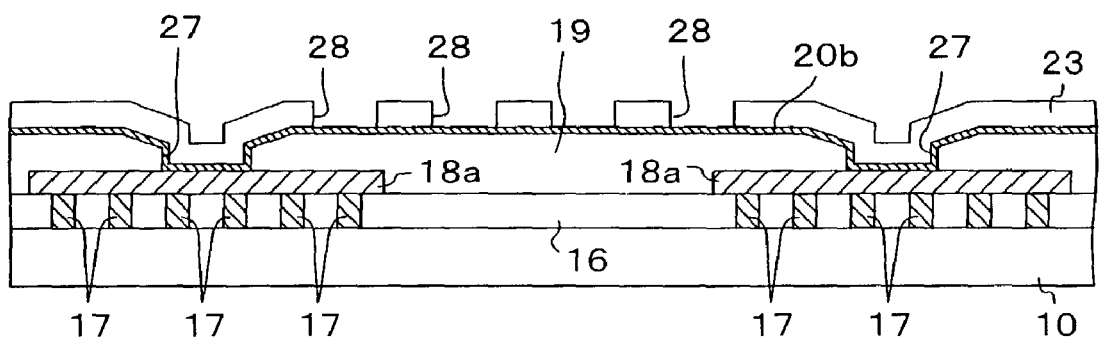
FIG. 21 is a cross-sectional view of a portion between capacitance sensor electrodes of the capacitance detection type sensor of the fourth embodiment.

FIG. 20 is a plan view showing a configuration of a capacitance detection type sensor (fingerprint sensor) of a fourth embodiment of the present invention. FIG. 21 is a cross-sectional view of a portion between capacitance sensor electrodes of the same capacitance detection type sensor.

The capacitance detection type sensor of this embodiment is different from that of the first embodiment in the structure of the ESD hole portion, and the structures of others are basically similar to those of the first embodiment. Therefore, the same reference numerals are added to matters in FIG. 20 and FIG. 21, which are the same as those in FIG. 5 and FIG. 7, and description for the repeated portions will be omitted. Moreover, in FIG. 21, illustration from the first interlayer insulating film to the second layer wire is omitted.

In this embodiment, on the second interlayer insulating film 16 in the vicinities of corner portions of the capacitance sensor electrodes 22, the first electrostatic discharge electrode films 18a electrically connected to the semiconductor substrate 10 through the tungsten plugs 17 are formed. Moreover, on the third interlayer insulating film 19, the second electrostatic discharge electrode film 20b made of a TiN film is formed. The second electrostatic discharge electrode film 20b is electrically connected to the first electrostatic discharge electrode films 18a through the contact holes 27 formed in the third interlayer insulating film 19. Moreover, the second electrostatic discharge electrode film 20b is formed in the form of mesh so as to cover gaps among the capacitance sensor electrodes 22.

The ESD holes 28 are arrayed along the respective sides of the capacitance sensor electrodes 22. On bottom portions of the ESD holes 28, the second electrostatic discharge electrode film 20b is exposed.

Also in the capacitance detection type sensor of this embodiment, similarly to the third embodiment, the ESD holes 28 are formed in positions apart from connected portions of the first electrostatic discharge electrode films 18a and the second electrostatic discharge electrode film 20b. Therefore, even if the moisture and the salt enter the ESD holes 28, there is no apprehension that the first electrostatic discharge electrode films 18a are corroded, and the high reliability can be maintained for a long period of time.

Moreover, in this embodiment, the ESD holes are arranged at a high density, and the gross area of the ESD holes is large. Therefore, this embodiment has an advantage in that the breakdown of the sensor due to the discharge can be prevented more securely as compared with the other embodiments.

(Fifth Embodiment)

Figure 22:
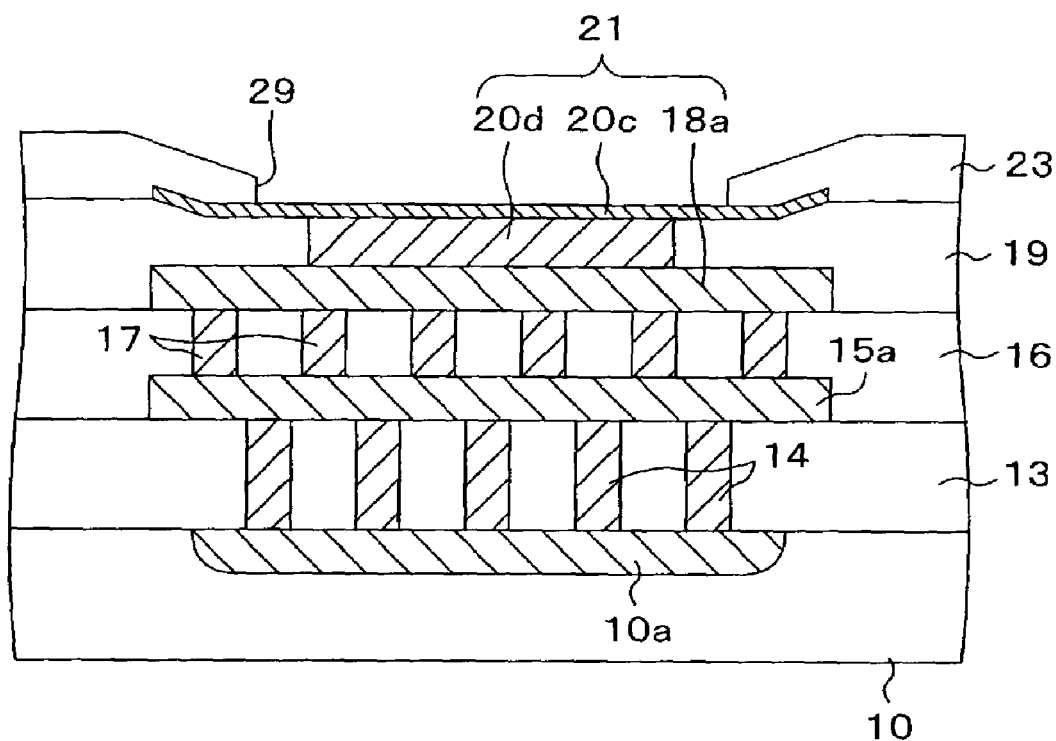
FIG. 22 is a cross-sectional view of an ESD hole portion of a capacitance detection type sensor (fingerprint sensor) of a fifth embodiment of the present invention.
Figure 23:
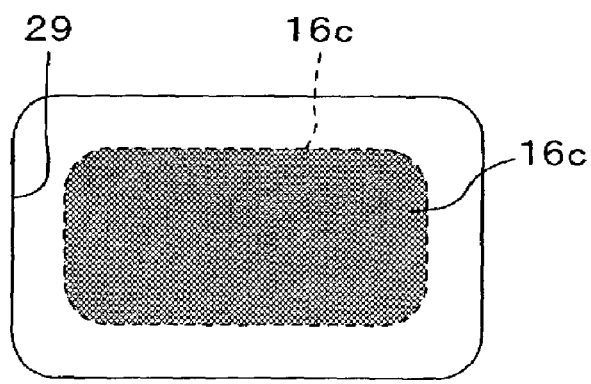
FIG. 23 is a plan view of the ESD hole portion of the capacitance detection type sensor of the fifth embodiment.

Hereinafter, description will be made for a capacitance detection type sensor (fingerprint sensor) of a fifth embodiment of the present invention with reference to a cross-sectional view of an ESD hole portion, which is shown in FIG. 22, and a plan view of the ESD hole portion, which is shown in FIG. 23.

The capacitance detection type sensor of this embodiment is different from that of the first embodiment in the structure of the ESD hole portion, and the structures of others are basically similar to those of the first embodiment. Therefore, the same reference numerals are added to matters in FIG. 22, which are the same as those in FIG. 7, and description for the repeated portions will be omitted. Moreover, since the configuration of the capacitance sensor electrode portion is basically similar to that of the first embodiment, description for the capacitance sensor electrode portion will be omitted here.

In this embodiment, a tungsten plug (conductor portion) 20d is buried in the third interlayer insulating film 19. The first electrostatic discharge electrode film 18a and the second electrostatic discharge electrode film 20c made of a TiN film are electrically connected to each other through the tungsten plug 20d. The ESD electrode 21 is composed of these first electrostatic discharge electrode film 18a, tungsten plug 20d and second electrostatic discharge electrode film 20c.

Specifically, in this embodiment, similarly to the first embodiment, the first electrostatic discharge electrode film 18a is formed on the second interlayer insulating film 16, and then the third interlayer insulating film 19 is formed above the entire upper surface of the substrate 10. Thereafter, by the photolithography method, an opening is formed in the third interlayer insulating film 19. Then, above the entire upper surface of the substrate 10, a Ti film and a TiN film are formed, and further, a tungsten film is formed thereon. Thus, tungsten is buried in the opening of the third interlayer insulating film 19. Thereafter, by the CMP, the tungsten film, the TiN film and the Ti film on the third interlayer insulating film 19 are removed. In such a manner, the tungsten plug 20d is formed.

Subsequently, a TiN film is formed to have a thickness of approximately 200 nm above the entire upper surface of the substrate 10. This TiN film is patterned to form the second electrostatic discharge electrode film 20c. Thereafter, a $SiO_2$ film with a thickness of approximately 100 nm and a SiN film with a thickness of approximately 700 nm are sequentially formed to form the cover film 23. In such a manner as described above, the capacitance detection type sensor of this embodiment is completed.

Note that, though a material of the plug 20d is not limited to tungsten, it is necessary to form the plug 20d of a material higher in corrosion resistance than the first electrostatic discharge electrode film 18a.

In this embodiment, the tungsten plug 20d is formed between the first electrostatic discharge electrode film 18a and the second electrostatic discharge electrode film 20c. Therefore, there is less apprehension that cracks occur in the second electrostatic discharge electrode film (TiN film) 20c due to the temperature change. Moreover, even if the cracks occur in the second electrostatic discharge electrode film 20c, and further, the moisture and the salt enter the ESD hole 29, since the tungsten plug 20d is interposed between the second electrostatic discharge electrode film 20c and the first electrostatic discharge electrode film 18a, there is no apprehension that the first electrostatic discharge electrode film 18a containing aluminum as a main component is corroded. Accordingly, also in the capacitance detection type sensor of this embodiment, the high reliability can be maintained for a long period of time.

Note that, though description has been made for the case where the ESD electrode is formed of the film containing aluminum as a main component and the TiN film in any of the above-described first to fifth embodiments, the ESD electrode is not limited to this. For example, in the case where the wires of the drive circuit are formed of copper (Cu) or a copper alloy, the ESD electrode can also be formed of a copper or copper alloy film and the TiN film. Moreover, instead of the TiN film, a high melting point metal film such as a Ti film, molybdenum (Mo) film and a tungsten (W) film can be used as well as a high melting point metal nitride film such as a MoN film and a WN film.

Furthermore, though description has been made for the case where the present invention is applied to the fingerprint sensor in any of the above-described embodiments, the present invention is not limited to the fingerprint sensor thereby, and the present invention can be applied to any sensor for detecting a capacitance distribution of a fine portion.

What is claimed is:

1. A capacitance detection type sensor provided with a plurality of capacitance sensor electrodes, comprising:
   a substrate;
   an insulating film formed on the substrate;
   a first electrostatic discharge electrode film conductive and formed on the insulating film;
   a second electrostatic discharge electrode film conductive and formed so as to be electrically connected to the first electrostatic discharge electrode film; and
   a cover film covering surfaces of the plurality of capacitance sensor electrodes and having a plurality of openings provided therein, the openings reaching the second electrostatic discharge electrode film.

2. The capacitance detection type sensor according to claim 1, wherein any of the openings provided in the cover film has any one of a diameter and a width equal to/less than 5 µm.

3. The capacitance detection type sensor according to claim 1, wherein the plurality of openings are arranged evenly on the second electrostatic discharge electrode film.

4. The capacitance detection type sensor according to claim 1, wherein the first electrostatic discharge electrode film and the second electrostatic discharge electrode film are formed in positions closer to the substrate than a position of the capacitance sensor electrodes.

5. The capacitance detection type sensor according to claim 1, wherein a wire formed between the capacitance sensor electrodes and the substrate and electrically connected to the capacitance sensor electrodes is provided, and the second electrostatic discharge electrode film is formed in a same wiring layer as a layer of the wire.

6. The capacitance detection type sensor according to claim 1, wherein the openings are formed in a form of stripes in the cover film.

7. The capacitance detection type sensor according to claim 1, wherein the openings are formed in a form of concentric circles in the cover film.

8. The capacitance detection type sensor according to claim 1, wherein the first electrostatic discharge electrode film is made of metal containing aluminum as a main component, and the second electrostatic discharge electrode film is made of TiN.

9. The capacitance detection type sensor according to claim 1, wherein the first and second electrostatic discharge electrode films are grounded through the substrate.

10. A capacitance detection type sensor provided with a plurality of capacitance sensor electrodes, comprising:
    a substrate;
    a first insulating film formed on the substrate;
    a first electrostatic discharge electrode film conductive and formed on the first insulating film;
    a second insulating film formed on the first insulating film and the first electrostatic discharge electrode film;
    a second electrostatic discharge electrode film formed so as to be electrically connected to the first electrostatic discharge electrode film through a contact hole formed in the second insulating film; and
    a cover film covering surfaces of the plurality of capacitance sensor electrodes and having an opening provided therein, the opening reaching the second electrostatic discharge electrode film.

11. The capacitance detection type sensor according to claim 10, wherein the capacitance sensor electrodes are formed on the second insulating film.

12. The capacitance detection type sensor according to claim 10, wherein the first electrostatic discharge electrode film is made of metal containing aluminum as a main component, and the second electrostatic discharge electrode film is made of TiN.

13. The capacitance detection type sensor according to claim 10, wherein the opening of the cover film is formed above a connected portion of the first electrostatic discharge electrode film and the second electrostatic discharge electrode film.

14. The capacitance detection type sensor according to claim 10, wherein the opening of the cover film is formed in a position different from a position of the connected portion of the first electrostatic discharge electrode film and the second electrostatic discharge electrode film.

15. The capacitance detection type sensor according to claim 14, wherein the opening of the cover film is formed along sides of the capacitance sensor electrodes.

16. The capacitance detection type sensor according to claim 10, wherein the first and second electrostatic discharge electrode films are grounded through the substrate.

17. A capacitance detection type sensor provided with a plurality of capacitance sensor electrodes, comprising:
   a substrate;
   a first insulating film formed on the substrate;
   a first electrostatic discharge electrode film conductive and formed on the first insulating film;
   a second insulating film formed on the first insulating film and the first electrostatic discharge electrode film;
   a conductor plug formed in an opening of the second insulating film and electrically connected to the first electrostatic discharge electrode film;
   a second electrostatic discharge electrode film formed so as to be electrically connected to the conductor plug; and
   a cover film covering surfaces of the plurality of capacitance sensor electrodes and having an opening provided therein, the opening reaching the second electrostatic discharge electrode film.

18. The capacitance detection type sensor according to claim 17, wherein the first electrostatic discharge electrode film is made of metal containing aluminum as a main component, the conductor plug is made of metal containing tungsten as a main component, and the second electrostatic discharge electrode film is made of TiN.

19. The capacitance detection type sensor according to claim 17, wherein the capacitance sensor electrodes are formed on the second insulating film.

20. The capacitance detection type sensor according to claim 17, wherein the conductor plug is formed of a material difficult to be corroded in comparison with a material of the first electrostatic discharge electrode film.

21. The capacitance detection type sensor according to claim 17, wherein the first and second electrostatic discharge electrode films are grounded through the substrate.

* * * * *